US008266968B2

(12) United States Patent
Pelkkala

(10) Patent No.: US 8,266,968 B2
(45) Date of Patent: Sep. 18, 2012

(54) METHOD, A SYSTEM, AND A CONTROL CIRCUIT FOR TAKING MEASUREMENTS IN A CRIMPING MACHINE

(75) Inventor: Seppo Pelkkala, Yliharma (FI)

(73) Assignee: Lillbacka Powerco Oy, Harma (FI)

( * ) Notice: Subject to any disclaimer, the term of this patent is extended or adjusted under 35 U.S.C. 154(b) by 252 days.

(21) Appl. No.: 12/659,819

(22) Filed: Mar. 23, 2010

(65) Prior Publication Data

US 2010/0242276 A1 Sep. 30, 2010

(30) Foreign Application Priority Data

Mar. 26, 2009 (FI) .................................... 20095318

(51) Int. Cl.
*G01D 1/16* (2006.01)

(52) U.S. Cl. ........................................ 73/790; 73/760

(58) Field of Classification Search .................... 73/760, 73/790

See application file for complete search history.

(56) References Cited

U.S. PATENT DOCUMENTS

| | | | | |
|---|---|---|---|---|
| 3,961,401 | A * | 6/1976 | Ferrier et al. | 28/249 |
| 5,195,042 | A * | 3/1993 | Ferraro et al. | 700/117 |
| 5,271,254 | A | 12/1993 | Gloe et al. | |
| 5,351,374 | A * | 10/1994 | Nabulon et al. | 28/271 |
| 6,044,547 | A * | 4/2000 | Cuevas et al. | 29/715 |
| 6,212,924 | B1 * | 4/2001 | Meisser | 72/21.4 |
| 7,383,709 | B2 * | 6/2008 | Intagliata et al. | 72/21.5 |
| 7,587,918 | B2 * | 9/2009 | Imgrut | 72/21.4 |
| 2001/0004154 | A1 | 6/2001 | Sausner | |
| 2007/0028660 | A1 | 2/2007 | Intagliata et al. | |
| 2008/0172898 | A1 | 7/2008 | Yagi et al. | |

FOREIGN PATENT DOCUMENTS

| | | | |
|---|---|---|---|
| EP | 1 071 173 | A2 | 1/2001 |
| JP | A-08-171975 | | 7/1996 |
| WO | WO 00/45476 | | 8/2000 |
| WO | WO 01/33675 | A1 | 5/2001 |

OTHER PUBLICATIONS

Extended Search Report issued in European Patent Application No. 10397505.8 dated Sep. 13, 2011.

Sep. 11, 2009 Finnish Search Report issued in Finnish Patent Application No. 20095318 (with English translation).

* cited by examiner

*Primary Examiner* — Max Noori
(74) *Attorney, Agent, or Firm* — Oliff & Berridge, PLC

(57) ABSTRACT

A crimping system, a control circuit for a crimping machine, and a method to be applied in them, in which: a work piece (15) is subjected to a first force effect by an actuator (5) that is controlled by the pressure of pressurized medium, wherein said force effect is proportional to said pressure and causes a desired deformation in the work piece (15); a follow-up measurement is taken, whose measurement result is proportional either to the dimension of the work piece (15) or said pressure; the work piece (15) is subjected to a second force effect but by applying a reduced pressure which is lower than the pressure that contributes to said deformation; and a verifying measurement is taken, whose measurement result is proportional to the dimension of the work piece (15), when said reduced pressure controls said actuator (5) and the work piece (15) is still in the crimping machine (1).

18 Claims, 2 Drawing Sheets

METHOD, A SYSTEM, AND A CONTROL CIRCUIT FOR TAKING MEASUREMENTS IN A CRIMPING MACHINE

FIELD OF THE INVENTION

The invention relates to a method in a crimping machine, and a crimping system, as well as a control circuit for a crimping machine.

BACKGROUND OF THE INVENTION

According to prior art, crimping machines are used for making various crimp connections and for joining pieces by crimping, in which machines the crimping tool comprises several jaw segments which are placed in a circular array and are movable radially in relation to the work piece to be machined and the centre of the crimping tool. In this description, the term jaw will also be used for referring to a jaw segment.

The piece to be machined by said crimping machine is typically a connector, known as such, which is clamped around a flexible hose to make a tight fitting. Part of the structure of the connector is also fitted inside the hose.

For making the crimp connection, the hose and the connector are joined and placed in an opening in the centre of the crimping machine, after which the jaws are used to perform crimping from several radial directions towards the centre of the crimping tool. The number of jaws may be 8 or more, normally an even number, and they are normally placed two by two on opposite sides of the work piece. The jaws normally cover an equal share of the circular shape, and they are normally placed at substantially even intervals on the circle. The crimp connection is based on a deformation of the work piece, whereby the diameter of the outermost part, for example collar, of the connector placed around, for example, a flexible hose is reduced, pressing the hose tightly between an inner part and the outermost part of the connector.

The opposite jaws, as a pair, delimit the minimum and maximum diameter of the opening left between them. The jaws determine the minimum diameter of the opening, when the adjacent jaws are tightly against each other and the radial movement towards the centre of the opening has been completed. With openings larger than this, the jaws can be apart from each other, and it is possible to perform crimping by applying a desired force effect. Forces, which are preferably equal in magnitude, are effective on the work piece from radial directions and cause the desired deformation, by means of which it is possible to connect different parts of the work piece to each other.

The position of the jaws or the size of the opening is measured either directly or indirectly, in order to know the size of the opening in each situation and at different stages of crimping. The measurement can be taken from a mechanism that moves the jaws, or from an actuator effective on the jaws or said mechanism. This is typically the measurement of the position. During crimping, the size of the opening is monitored, and the crimping is ended after a predetermined opening size or measurement has been achieved. Said predetermined opening size or measurement is selected according to the type of the work piece, the size of the work piece, the materials, or other parameters relating to the work piece or objectives for the crimping process or the desired deformation.

The above presented crimping machines can also be used for making corrugations, reductions and other deformations, for example, at the ends of tubes. A crimping machine of prior art for making various crimp connections and for joining pieces by crimping is disclosed in document EP 1230716 A1.

The operation of the jaws of the crimping machine is based on various mechanisms. The jaws are functionally coupled to a mechanism that forces the jaws to move simultaneously and in the radial direction. It may be a mechanism in a single piece or in several pieces, comprising wedge-like counter surfaces or guiding surfaces or moving in a direction perpendicular to a line extending through the centre of the opening. It may also be an annular or circumferential wedge mechanism based on, for example, one or two cones moving in parallel with the line extending through the centre of the opening. The jaws and the mechanism are moved by one or more actuators which are typically cylinder actuators driven by pressurized medium. The actuator exerts a force effect on the work piece by means of the jaws and the mechanism.

After the crimping process, the work piece is removed from the crimping machine and is subjected to a verifying measurement. The purpose of the verifying measurement of the work piece is, apart from quality control, to control that the final size of the work piece after the crimping, particularly its diameter, corresponds to a predetermined size or measurement. Said final size will depend on the size of the opening of the crimping machine that was achieved at the end of the crimping. In prior art, the control has been made in a separate measuring device, so that it is obvious that the verifying measurements take time, cause delays and increase the number of work stages. These work stages delay the readjustments and corrections that need to be made in the settings of the crimping machine and its control system so that the final size of the work piece and, at the same time, the resulting crimp connection would meet the requirements set for a work piece and a reliable crimp connection. Because a separate verifying measurement is not taken for each work piece, a production batch of work pieces may also contain defective work pieces.

Particularly in the case of crimp connections that will be subjected to pressure loading, it is vitally important that the connections are leak-free and safe. It should also be possible to make quick changes in the settings of the crimping machine and its control system, to prevent the production of defective work pieces or to significantly reduce their number. It is also important to detect significant changes in the crimping process in time.

SUMMARY OF THE INVENTION

The aim is to eliminate drawbacks relating to the prior art.

The method according to the invention will be presented in claim 1. The system according to the invention will be presented in claim 12. The control circuit according to the invention will be presented in claim 17.

The aim is to integrate the measurement of the work piece in the operation of the crimping machine, wherein the measurements can be taken faster, the crimping process can be monitored more effectively, and corrections can be made quickly in the settings. In particular, it is now possible to implement quality control more efficiently, because both the follow-up measurements taken during the crimping process and also the measurement results from the verifying measurements or final measurements taken after the crimping process are available in the control system of the crimping machine, and it is possible to obtain even work-piece specific reports immediately after the work stages of the crimping process.

In an embodiment, use is made of measuring devices, for example various sensors, which are already available in the crimping device.

The crimping device is controlled before the verifying and final measurement so that said measurement can also take into account all the deformations which take place in the work piece after the crimping process has ended and the force exerted for crimping is no longer effective on the work piece. As to the crimping machine, care is also taken that strains and deformations in the structure of the crimping machine itself do not affect the measurement results. The removal of the force effect will eliminate strains and deformations both in the work piece and in the mechanism, the jaws and the actuator.

In an example, the crimping is controlled by means of the pressure of pressurized medium. The crimping machine typically comprises a cylinder actuator which is controlled by hydraulic power, that is, by the pressure and volume flow of pressurized medium, and which generates a force that moves the jaws and is effective in crimping.

In an example, the pressure in the working chamber of the cylinder actuator or a pressurized medium line connected to it is measured. A measuring device is included in the control circuit for the pressurized medium of the crimping machine, to enable the monitoring of the pressure.

In an example, the cylinder actuator comprises a measuring device that measures the displacement or position of its piston, to be utilized in the measurements both during and after the crimping process. By using only a single measuring device, a compact structure is obtained and the use and installation of several measuring devices is avoided. Said measuring device is based on a way of action known as such, and is, for example, a position sensor, a slider potentiometer, or a digital sensor. The simplest way is to place said measuring device in connection with an actuator, wherein it is possible to avoid the placement of the measuring device between the jaws or at the mechanism controlling them, where it may be difficult to place because of lack of space or in a sufficiently protected way. Preferably, said measuring device monitors the movement of the piston of the cylinder actuator or a part coupled to the piston, in relation to the frame of the crimping machine or another suitable reference. The measuring can also be performed by a separate measuring device which is provided for this purpose in the crimping machine and which performs the measuring of the work piece either directly or indirectly. The crimping machine may comprise separate measuring devices for follow-up and verifying measurements.

In connection with the verifying measurement and the final measurement, the pressure is reduced to a predetermined low level, after which the work piece is measured by said measuring device. The reduction in pressure will diminish force effects and thereby eliminate said strains and restore deformations which could cause inaccuracies in the measurement results.

According to an example, the control circuit for the pressurized medium, controlling the actuator, is supplemented with a measuring device for pressure measurement, for example a pressure sensor, as well as control members for reducing the pressure to a desired level in a controlled manner. The control members comprise, for example, an electronically controllable shutoff valve (on/off valve) or a directional valve, and a controllable throttle valve or another valve for controlling the flow of the pressurized medium. Other valves can also be used for allowing and preventing the flow of the pressurized medium in such a way that at the same time, the desired pressure level can be maintained in a line of the control circuit for the pressurized medium. The control members are preferably placed in a line that is connected to the actuator or is connected particularly to the working chamber of the cylinder actuator. During measuring, the pressure is, for example, 5 to 10 bar. During crimping, the applied pressure is considerably higher, for example 100 to 300 bar.

The control system that controls the operation of the crimping machine and of the control circuit for the pressurized medium is modified so that the crimping, the controlled pressure reduction and the measurement during and after the crimping are performed under said control system and the control algorithm stored therein. The input for the control system consists, among other things, of a pressure signal and signals relating to or proportional to the measurement of the work piece, and the output consists, among other things, of the control signal to be input in the control members. The control system is based on the operation and components of control systems known as such, which a person skilled in the art can modify on the basis of this description in such a way that the presented crimping process, system configuration and method can be implemented.

BRIEF DESCRIPTION OF THE DRAWINGS

In the following, the invention will be described in more detail with reference to the appended drawings, in which.

MORE DETAILED DESCRIPTION OF THE INVENTION

Figure 1:
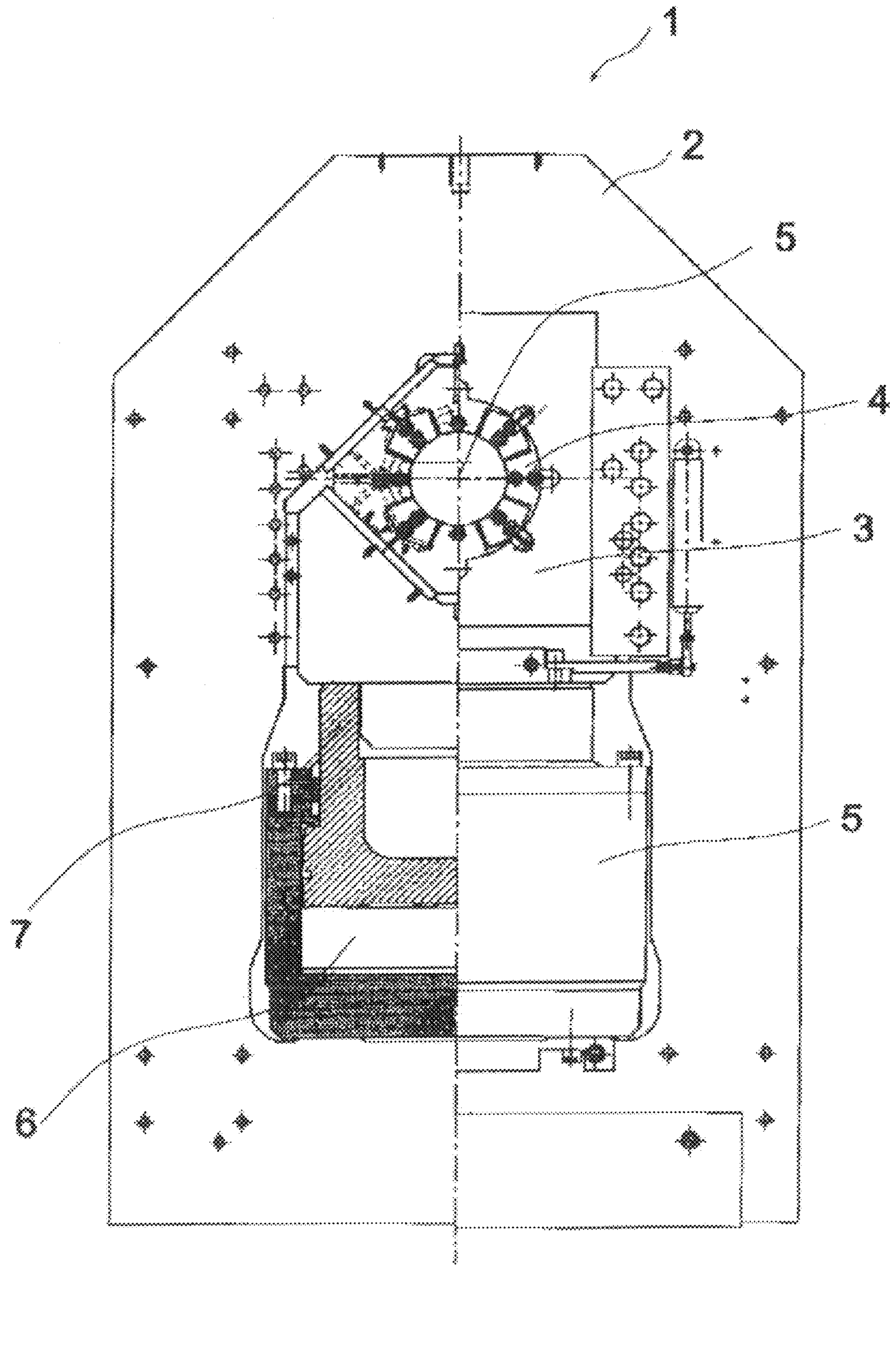
FIG. 1 shows, as to an example, a crimping machine, in which the invention is applied.
Figure 2:
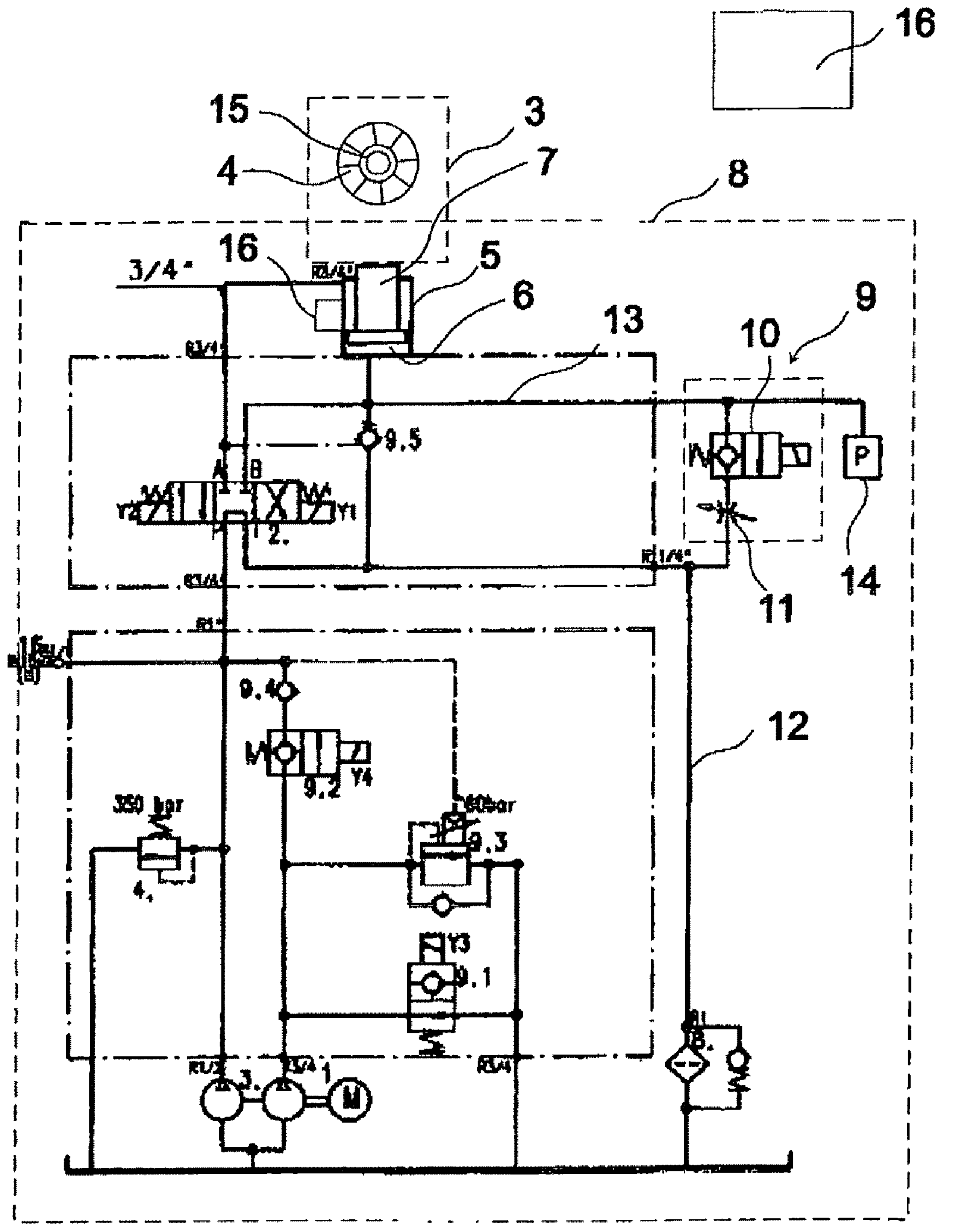
FIG. 2 shows, as an example, a control circuit for pressurized medium of the crimping machine, a control system, and a crimping machine, in which the invention is applied.

FIG. 1 shows an example of a crimping machine, in which the processes, operations and features presented in this description can be performed and applied. In FIG. 1, a crimping machine 1 is shown in a partial cross section, for clarity. The crimping machine 1 comprises a frame 2 that is, for example, a C or O configuration. The frame 2 accommodates an actuator 5 which, in this case, is a cylinder actuator comprising a movable piston 7 and a working chamber 6, into which pressurized medium is introduced. The pressurized medium is, for example, hydraulic oil. The pressure of the pressurized medium is effective on the piston 7 and its effective area, moving and generating a force effect that is transmitted to a work piece 15 (FIG. 2). The operation of the working chamber 6 is based on the principle of displacement, known as such. The piston 7 is moved in a desired reciprocating manner by pressurized medium controlled by a control member. The actuator may be single-acting, but in this example, the actuator is double-acting, in which case there is an opposite working chamber on the opposite side of the piston.

The force effect is transmitted to the work piece 15 by means of a mechanism 3 and jaws 4 connected to the same. Between the jaws 4 there is the opening 5 of the crimping machine, in which the work piece is placed and in relation to whose centre the jaws are moved radially. With respect to the operation of the crimping machine 1, reference is made to the principles described already above in this description.

FIG. 2 shows a control system 16 controlling the operation of the crimping machine 1, and a control circuit 8 for pressurized medium. The control circuit 8 is partly based on components which are known as such and include a pump for producing a volume flow and pressure, a directional valve for controlling the direction of the movement of the actuator 5 or for stopping it, if necessary, the necessary pressure relief valves, as well as lines for pressurized medium. The control circuit 8 comprises the control members necessary for the operation, which are preferably electronically controllable. A control member 9 for controlling the pressure reduction is placed in line 13 which is preferably in a continuous connection with the working chamber 6. The control member 9 controls the pressure in the line 13 and the entry of the pressurized medium into a tank line 12.

With respect to the operation of the system shown in FIG. 2, reference is made to the principles described already above in this description.

FIG. 2 also shows a mechanism 3, on which the actuator 5 is effective. The actuator 5 is a cylinder actuator. The mechanism 3, in turn, controls the jaws 4 which exert a force effect on the work piece 15. A measuring device 16 is coupled to the actuator 5 to monitor the position of the piston 7. On the basis of the measurement result and the signal from the measuring device 16, it is possible to calculate the size or dimension of the work piece 15, because the geometry of the mechanism 3 and the jaws 4 is known.

We shall now look at the operation of the crimping process and the taking of the measurements.

The parts of the crimping machine deform when they become warm, and as a result, inaccuracies occur in the dimensions of the work piece obtained during the crimping process. There are many factors effective on accuracy of the crimping process, but one of the most important factors is delays in the control member of the control circuit. Said delays are further influenced by the temperature and pressure of the pressurized medium and the control member. Other effective factors include dimensional tolerances of the work pieces to be crimped, as well as the crimping force needed for their working and variations in friction of the sliding surfaces in the mechanism of the crimping machine.

In the presented example, functions are built in the control system 16 of the crimping machine 1, for example, for giving alarms and for control that automatically corrects the settings or parameters set, and the functions also include a system for collecting data on measurements. The measurements are taken reliably in connection with the crimping process. In this way, a fast and relatively accurate measurement is obtained.

Previously, the desired dimension of the work piece in crimping was controlled by monitoring the signal of the measuring device solely during the movement of the jaws of the crimping machine and by taking into account a correcting measurement which depends on the delay of the control member that controls the actuator and on the deformation of the parts of the crimping machine, for example its jaws. The crimping was stopped when the desired measurement result had been achieved, taking into account said correcting measurement. Immediately after this, the jaws were opened and the direction of movement of the actuator was changed. However, there was no attempt to reduce the pressure in the working chamber of the actuator to a given level in a controlled manner, and the crimping was not maintained at said pressure. It is obvious that the use of the correcting measurement was a relatively rough and inflexible method for minimizing defects arising during crimping.

During the movement of the jaws 4 of the crimping machine 1, the maximum pressure of the working chamber 6 of the actuator 5, or a control circuit 8 connected to it, for example line 13, is measured, preferably by means of a pressure sensor used as the measuring device 14. The movement of the jaws 4 is stopped, if the pressure or the measurement result has, within certain limits, reached a predetermined level or value set in the control system 16.

Alternatively, the movement of the jaws 4 is stopped, if the size or dimension of the work piece 15 has, within certain limits, reached the predetermined value or size set in the control system 16. According to an example, the control system 16 monitors both the pressure and the dimension, and stops the movement of the crimping machine 1 when the pressure or dimension is as desired. According to an example, the control system 16 monitors both the pressure and the dimension and stops the movement of the crimping machine 1 when both the pressure and the dimension are at predetermined levels, within set limits.

After the jaws 4 and the actuator 5 of the crimping machine have been stopped, the pressure prevailing in the actuator 5 is reduced to a level that corresponds to a pressure selected or set in advance. The pressure is reduced either immediately or after a delay from the stopping. It is a so-called measuring pressure, during whose action on the actuator 5 the position of the jaws 4 is measured, either directly from the jaws 4 or indirectly from, for example, the measuring device 16 of the actuator 5, or from the mechanism, in order to determine the size and dimensions of the work piece 15, and particularly its altered final outer diameter. The size or dimension of the work piece 15 can be determined, because it is, in a determined manner depending on the construction of the crimping machine 1, proportional to e.g. the signal and measurement result given by the measuring device 16.

The pressure is calculated, for example, by electronically controlled control members 9 which are connected to a line 13 leading to the working chamber 6. The lines of pressurized medium can be implemented by means of hoses, pipes or bored channels in valve blocks. The control members 9 preferably comprise an electronically controlled on/off valve 10, for example a normally closed two-position two-pass valve, and an adjustable throttle valve 11 connected in series on line 13.

The measuring pressure is typically about 5 to 10 bar. The level of the measuring pressure is selected so that the jaws 4 of the crimping machine maintain the work piece 15 in their grip and are still in as close a contact as possible with it. Because the measurement, in this example, is not taken directly from the work piece 15, the jaws 4 must remain against the work piece 15 to take a reliable measurement, so that the measurement result would correspond to a given dimension of the work piece as well as possible. On the other hand, the level of the measurement pressure is also selected so that particularly tensions generated in the work piece 15 and in the jaws 4 have been released and eliminated. Because part of the deformations of the work piece 15 will reverse to a slight extent after the removal of the action of the crimping force and the dimensions of the work piece 15 will change, it is more reliable to measure the work piece 15 first after said reversal has occurred.

Other requirements for a reliable measurement include a controlled pressure reduction and a stable measuring pressure. Too great and fast pressure changes will cause vibrations and additional tensions or will unnecessarily move those parts of the crimping machine whose position is being measured. The rate of reducing the pressure is about 0.5 to 2.5 s from the crimping pressure to the measuring pressure, depending on the type of the crimping machine and on the pressure level from which the pressure is reduced.

The measurement defined for the work piece 15 is stored in the control system 16. At the same time, the measurement or pressure that triggers the stopping of crimping, or both of them, can be stored in the control system 16. Also other data on the work piece 15 can be recorded. It is also possible to collect data on the time and number of measurements, as well as the settings of the control system. From the stored data, work piece specific or batch specific reports and printouts or listings are composed for the purposes of quality control and other monitoring. The stored results can also be used for condition monitoring and calibration as well as adjusting of the crimping machine. The results are preferably stored in a standard format which can be utilized by various software. Preferably, the results can also be transferred, for example via a local area network, such as Ethernet, or a memory device, such as a USB memory, to other applications or computer hardware.

By the calibration of the crimping machine, it is possible to correct inaccuracies caused by the jaws and the mechanism of the crimping machine. Thus, the so-called offset value of the crimping machine is adjusted so that the result of the measurement of the work piece by the crimping machine is made to correspond to a measurement result obtained with an external measuring device or member. The measurement is taken in the crimping machine in the way described above. For the calibration of the crimping machine, there are two parameters: the measuring pressure and the offset value, which are used to correct the obtained measurement result.

The correction of the measurement result can also be adjusted automatically by means of the crimping machine. First of all, the crimping machine 1 performs the measurement during a stoppage of the jaws 4, and the control system 16 receives information on the dimension to which the work piece 15 went after the crimping, and furthermore, the values of the parameters used in the crimping process are known. In particular, the parameters include said desired dimension and pressure. By comparing the measurement result with the desired dimension, the magnitude of the error and the need for adjustment are found out. The correction relating to said compressing parameters will depend on the need for adjustment, and it is used for measuring during crimping. The crimping is stopped earlier or later, depending on the correction. The automation relating to the correction can be turned on and off as desired.

The materials of the work pieces to be machined often have relatively poor tolerances, so that the adjustment of the crimping machine or the correction of the measurement result cannot be made on the basis of only one or few crimping or measuring operations which seem defective. At least there is no reason to make an adjustment or correction at once in full. Furthermore, the resolution of the control of the crimping machine varies according to the machine type; as a result, it should be possible to adjust the magnitude of the correction as well.

As an example, the correction is made e.g. so that when the detected error exceeds, for example, 0.15 mm in average in the same direction during 2 to 6 successive crimping operations, the need for correction is half of the error. If the detected error is greater, for example at least 0.05 mm of the error is left uncorrected in each step in which a correction is made. In this case, 0.05 mm corresponds to the resolution of the control. In other words, if the detected error is 0.30 mm in average, the correction will first be 0.25 mm, and the rest of the error will be corrected in a new step and in connection with a new error inspection, if necessary.

If the detected error exceeds an alarm limit set in the control system, an alarm is given, if necessary, and the automatic correction is interrupted. After this, a correction can be made manually. Preferably, the automatic correction will reassume its operation normally after a possible manual correction and setting off of the alarm.

If the changes in the measurements and the detected errors are not due to, for example, the temperature, the fault is probably in the work piece to be machined. Thus, the correcting measure is primarily to reject the work piece and, if necessary, also to examine it more closely. The cause for significant single incorrect measurement results may also turn out to be, for example, a defect in a control member of the control circuit, or dirty pressurized medium, which both cause a delay in stopping the crimping. By means of the presented system, it is possible to quickly detect defects in the operation of the crimping machine. Work pieces of an incorrect type and, for example, negligent installation of a connector to a hose will cause, for example, an alarm, because the measurement result or maximum pressure deviates from the desired value. In this way, it is possible to quickly and reliably find the work pieces of insufficient quality.

The invention is not limited solely to the examples presented above, but it may vary according to the appended claims.

The invention claimed is:

1. A method in a crimping machine, the method comprising:

subjecting a work piece to a first force effect by an actuator controlled by the pressure of a pressurized medium, wherein said first force effect is proportional to said pressure and causes a desired deformation in the work piece;

taking follow-up measurements, whose measurement result is proportional to either the measurement of the work piece or the measured pressure;

subjecting the work piece to a second force effect after reaching the desired deformation in the work piece, that applies a reduced pressure of the pressurized medium, wherein the reduced pressure is lower than the pressure that contributes to said deformation; and taking a verifying measurement, whose measurement result is proportional to the dimension of the work piece having the desired deformation when said reduced pressure controls said actuator and the work piece having the desired deformation is still in the crimping machine.

2. The method according to claim 1, wherein the method further comprises:

stopping said first force effect when the measurement result of the follow-up measurement reaches a predetermined value or a predetermined range of variation for the value.

3. The method according to claim 1, wherein the method further comprises:

changing the first force effect to the second force effect after both said pressure and said dimension of the work piece have reached predetermined values or predetermined ranges of variation for the values.

4. The method according to claim 1, wherein the method further comprises:

storing the measurement result of the verifying measurement in the control system that controls the crimping machine.

5. The method according to claim 1, wherein the method further comprises:

performing said verifying measurement by means of a measuring device connected to the actuator and monitoring the position or displacement of the actuator.

6. The method according to claim 1, wherein the method further comprises:

performing said follow-up measurement by means of a measuring device which is connected to a control circuit controlling the actuator and which monitors the pressure of the actuator or a change in the pressure.

7. The method according to claim 1, wherein the method further comprises:

maintaining said force effects in different steps of the crimping process so that the jaws of the crimping machine which transmit the force effect to the work piece are held in contact with the work piece.

8. The method according to claim 1, wherein the method further comprises:

performing said verifying measurement when the work piece is in such a state in which the deformations of the work piece have been substantially completed.

9. The method according to claim 1, wherein the method further comprises:

reducing said pressure to said reduced pressure by leading pressurized medium from the actuator via a control member, the control member being configured to control the volume flow of the pressurized medium and the change in the pressure.

10. The method according claim 1, wherein the method further comprises:

comparing the measurement results of the follow-up measurement and the verifying measurement in the control system that controls the crimping machine; and performing, on the basis of the comparison, correction to said predetermined value or predetermined range of values, or both of them, if necessary.

11. The method according to claim 1, wherein the method further comprises:

collecting measurement results in the control system that controls the crimping machine, to be available for quality control, condition monitoring, or other follow-up and reporting.

12. A crimping system, the system comprising:

an actuator which exerts a first force effect on a work piece and is controlled by the pressure of a pressurized medium, wherein said first force effect is proportional to said pressure and causes a desired deformation in the work piece;

a measuring device for taking follow-up measurements, whose measurement result is proportional to either the measurement of the work piece or the measured pressure;

wherein the actuator is configured to exert a second force effect on the work piece after reaching the desired deformation in the work piece, that applies a reduced pressure of the pressurized medium, the reduced pressure is lower than the pressure that contributes to said deformation; and wherein the measuring device is configured to take a verifying measurement, whose measurement result is proportional to the dimension of the work piece having the desired deformation when said reduced pressure controls said actuator and the work piece having the desired deformation is still in the crimping machine.

13. The system according to claim 12, wherein the system further comprises:

a control system, under whose control said first force effect is stopped when the measurement result of the follow-up measurement reaches a predetermined value or a predetermined range of variation for the value.

14. The system according to claim 12, wherein the system further comprises:

a measuring device, which is configured to take said follow-up measurement, is in connection with a control circuit that controls the actuator and monitors the pressure of the actuator or a change in the pressure.

15. The system according to claim 12, wherein the system further comprises:

a control member configured to reduce said pressure to a reduced pressure by leading pressurized medium from the actuator via the control member, wherein the control member is further configured to control the volume flow of the pressurized medium and the change in the pressure.

16. The system according to claim 12, wherein said control system is configured to store measurement results of the follow-up measurement and the verifying measurement.

17. A control circuit for a crimping machine, comprising a control member configured to reduce the pressure applied during a crimping process and during follow-up measurements to a reduced pressure after reaching a desired deformation in a work piece, wherein the reduced pressure is applied during a verifying measurement that is taken after the crimping process, and wherein said follow-up measurements are taken of a work piece subjected to said crimping process.

18. The control circuit according to claim 17, wherein said control member comprises an on/off valve and a throttle valve.

* * * * *